United States Patent
Elqadah et al.

(10) Patent No.: US 7,108,277 B2
(45) Date of Patent: *Sep. 19, 2006

(54) AIR BAG MODULE WITH VENT COVER

(75) Inventors: Wael S. Elqadah, Gilbert, AZ (US); David G. Magoteaux, Mesa, AZ (US); Frank Paul Leonelli, Jr., Gilbert, AZ (US); Arnold M. Stephens, Imlay, MI (US); Robert R. Debbs, Yale, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 336 days.

This patent is subject to a terminal disclaimer.

(21) Appl. No.: 10/731,076

(22) Filed: Dec. 9, 2003

(65) Prior Publication Data
US 2004/0113406 A1 Jun. 17, 2004

Related U.S. Application Data

(63) Continuation-in-part of application No. 10/438,655, filed on May 15, 2003, now Pat. No. 6,893,041, which is a continuation-in-part of application No. 09/976,822, filed on Oct. 12, 2001, now abandoned.

(51) Int. Cl.
*B60R 21/26* (2006.01)
(52) U.S. Cl. ..................... 280/728.2; 280/739
(58) Field of Classification Search ............... 280/739, 280/736, 728.2, 740, 742
See application file for complete search history.

(56) References Cited

U.S. PATENT DOCUMENTS

| | | | |
|---|---|---|---|
| 5,234,229 A | 8/1993 | Gordon | |
| 5,320,379 A * | 6/1994 | Burnard et al. | 280/728.2 |
| 5,372,380 A * | 12/1994 | Duffy et al. | 280/740 |
| 5,613,704 A * | 3/1997 | White et al. | 280/740 |
| 5,695,214 A | 12/1997 | Faigle et al. | |
| 5,799,974 A | 9/1998 | Honda | |
| 5,853,192 A | 12/1998 | Sikorski et al. | |
| 5,918,898 A * | 7/1999 | Wallner et al. | 280/728.2 |
| 6,039,346 A | 3/2000 | Ryan et al. | |
| 6,082,765 A | 7/2000 | Bowers et al. | |
| 6,213,502 B1 | 4/2001 | Ryan et al. | |
| 6,406,055 B1 | 6/2002 | Faigle et al. | |
| 6,746,044 B1 * | 6/2004 | Elqadah et al. | 280/736 |
| 2001/0024031 A1 | 9/2001 | Ochiai | |
| 2001/0026063 A1 * | 10/2001 | Yokota | 280/732 |
| 2002/0089159 A1 | 7/2002 | Fischer et al. | |
| 2003/0146604 A1 * | 8/2003 | Sen et al. | 280/728.2 |
| 2005/0029784 A1 * | 2/2005 | Siegel et al. | 280/736 |
| 2005/0057027 A1 * | 3/2005 | Fogle et al. | 280/739 |
| 2005/0156419 A1 * | 7/2005 | Gabler et al. | 280/740 |

* cited by examiner

*Primary Examiner*—Paul N. Dickson
*Assistant Examiner*—Leonard J. McCreary, Jr.
(74) *Attorney, Agent, or Firm*—Tarolli, Sundheim, Covell & Tummino LLP

(57) ABSTRACT

An apparatus (10) for helping to protect an occupant of a vehicle includes an inflatable vehicle occupant protection device (12). An inflator (14) provides inflation fluid for inflating the protection device (12). A vent member (30) includes at least one vent opening (62) for venting the inflation fluid. A vent cover (100) has a closed condition for blocking fluid flow through the at least one vent opening (62) and an open condition for permitting fluid flow through the at least one vent opening. The vent cover (100) includes a side wall (110) that has at least one portion (134, 372) that projects from the side wall into the vent member (30) to help maintain the vent cover in the closed condition.

19 Claims, 7 Drawing Sheets

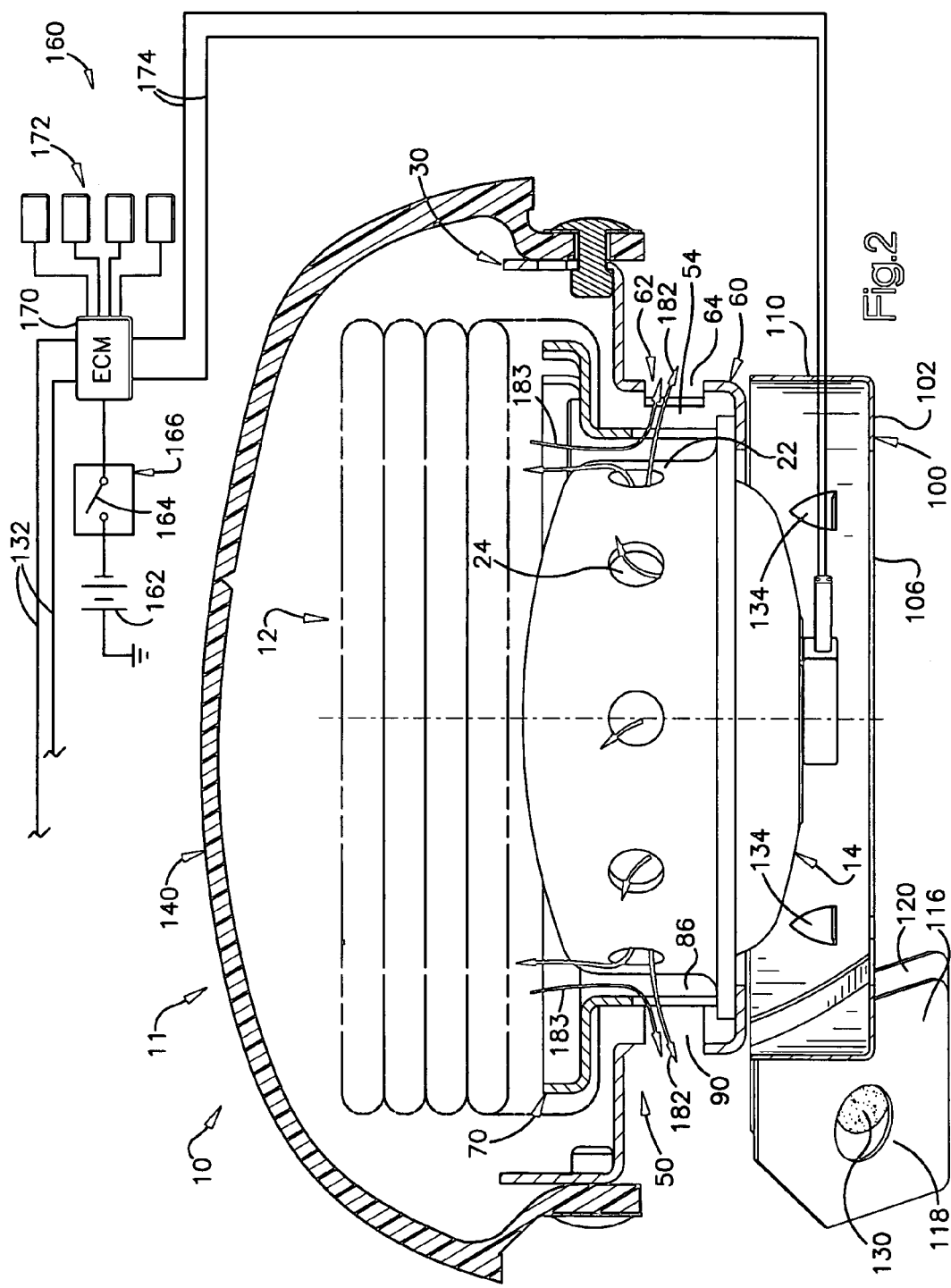

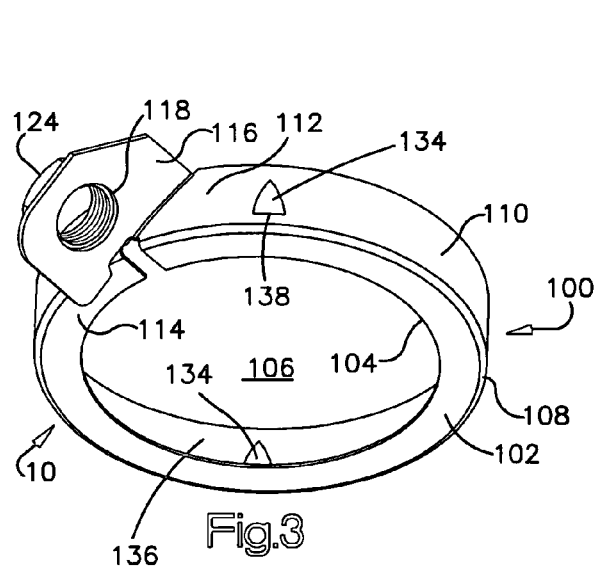
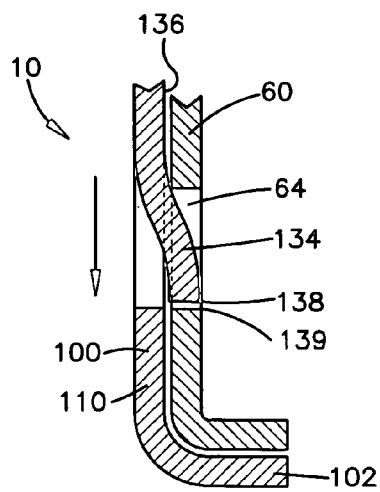
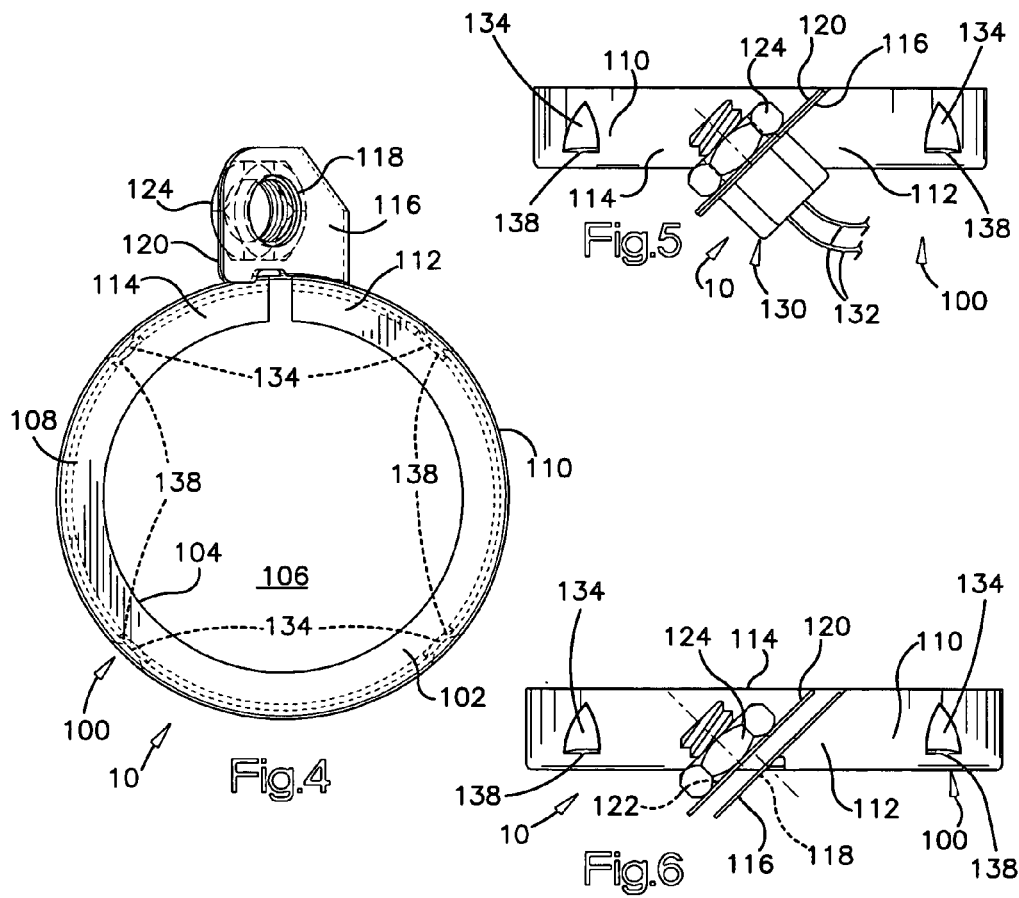
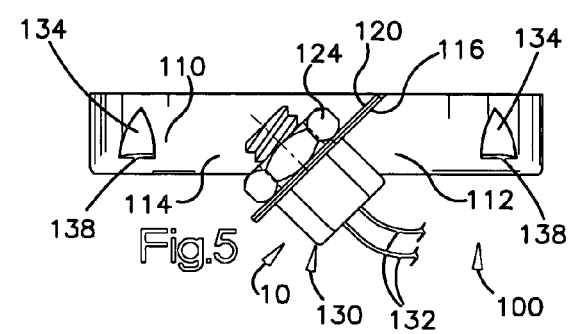
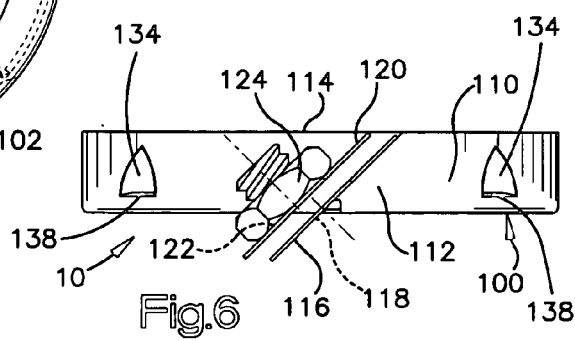

AIR BAG MODULE WITH VENT COVER

RELATED APPLICATIONS

This application is a continuation-in-part of U.S. patent application Ser. No. 10/438,655, filed on May 15, 2003, now U.S. Pat. No. 6,893,041 which is a continuation-in-part of U.S. patent application Ser. No. 09/976,822, filed on Oct. 12, 2001, now abandoned.

BACKGROUND OF THE INVENTION

The present invention relates to a vehicle occupant protection apparatus including an inflatable vehicle occupant protection device, such as an air bag. In particular, the present invention relates to an air bag module in which inflation fluid is selectively vented from the module, and to a cover for a vent in such a module.

DESCRIPTION OF RELATED ART

It is known to inflate an air bag to help protect a vehicle occupant in the event of sudden deceleration such as occurs in a vehicle collision. The air bag is stored in a deflated condition, together with an inflator, in a housing adjacent to the vehicle seat in which the occupant sits. The inflator, when actuated, provides a large volume of inflation fluid to inflate the air bag into a position to help protect the vehicle occupant.

Under normal circumstances, substantially all of the inflation fluid from the inflator is directed into the air bag to inflate the air bag. In some circumstances, however, it may be desirable to control or limit the amount of inflation fluid directed into the air bag. For example, if the vehicle occupant is smaller than a predetermined size or is closer to the vehicle instrument panel than a predetermined distance, then it may be desirable to reduce the speed and force with which the air bag inflates. It is known to vent inflation fluid from the housing of an air bag module in such circumstances, so that less inflation fluid is directed into the air bag. This venting may be accomplished by moving a member, such as a door panel, that normally covers a vent opening in the module.

SUMMARY OF THE INVENTION

The present invention relates to an apparatus for helping to protect an occupant of a vehicle. The apparatus includes an inflatable vehicle occupant protection device. An inflator provides inflation fluid for inflating the protection device. A vent member includes at least one vent opening for venting the inflation fluid. A vent cover has a closed condition for blocking fluid flow through the at least one vent opening and an open condition for permitting fluid flow through the at least one vent opening. The vent cover includes a side wall that has at least one portion that projects from the side wall into engagement with the vent member to help maintain the vent cover in the closed condition.

The present invention also relates to an apparatus including an inflatable vehicle occupant protection device inflatable to help protect a vehicle occupant. An inflator provides inflation fluid for inflating the protection device. The inflator has a plurality of inflation fluid outlets. A vent member is connected with the inflator. The vent member has a vent wall that includes at least one vent opening. A vent cover includes a side wall having at least one portion that projects from the side wall. The vent cover has a closed condition in which the at least one portion projects into the at least one vent opening to help connect the vent cover to the vent member. The vent cover has an open condition in which the at least one portion is retracted from the at least one vent opening to enable fluid flow through the at least one vent opening to vent inflation fluid from the apparatus. An actuatable device has an unactuated condition maintaining the vent cover in the closed condition. The actuatable device has an actuated condition that places the vent cover in the open condition to enable fluid flow through the vent opening to vent inflation fluid from the apparatus.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 2 is an illustration similar to FIG. 1 showing the vent cover in an open condition;

FIG. 3 is a perspective view of the vent cover of FIG. 1;

FIG. 4 is a bottom plan view of the vent cover of FIG. 1;

FIG. 5 is a side elevational view of the vent cover of FIG. 1, including an actuatable fastener shown in an unactuated condition;

FIG. 6 is a view similar to FIG. 5 showing the actuatable fastener in an actuated condition;

FIG. 6A is a magnified sectional view illustrating parts of the apparatus in an assembled condition;

DETAILED DESCRIPTION OF THE INVENTION

Figure 1:
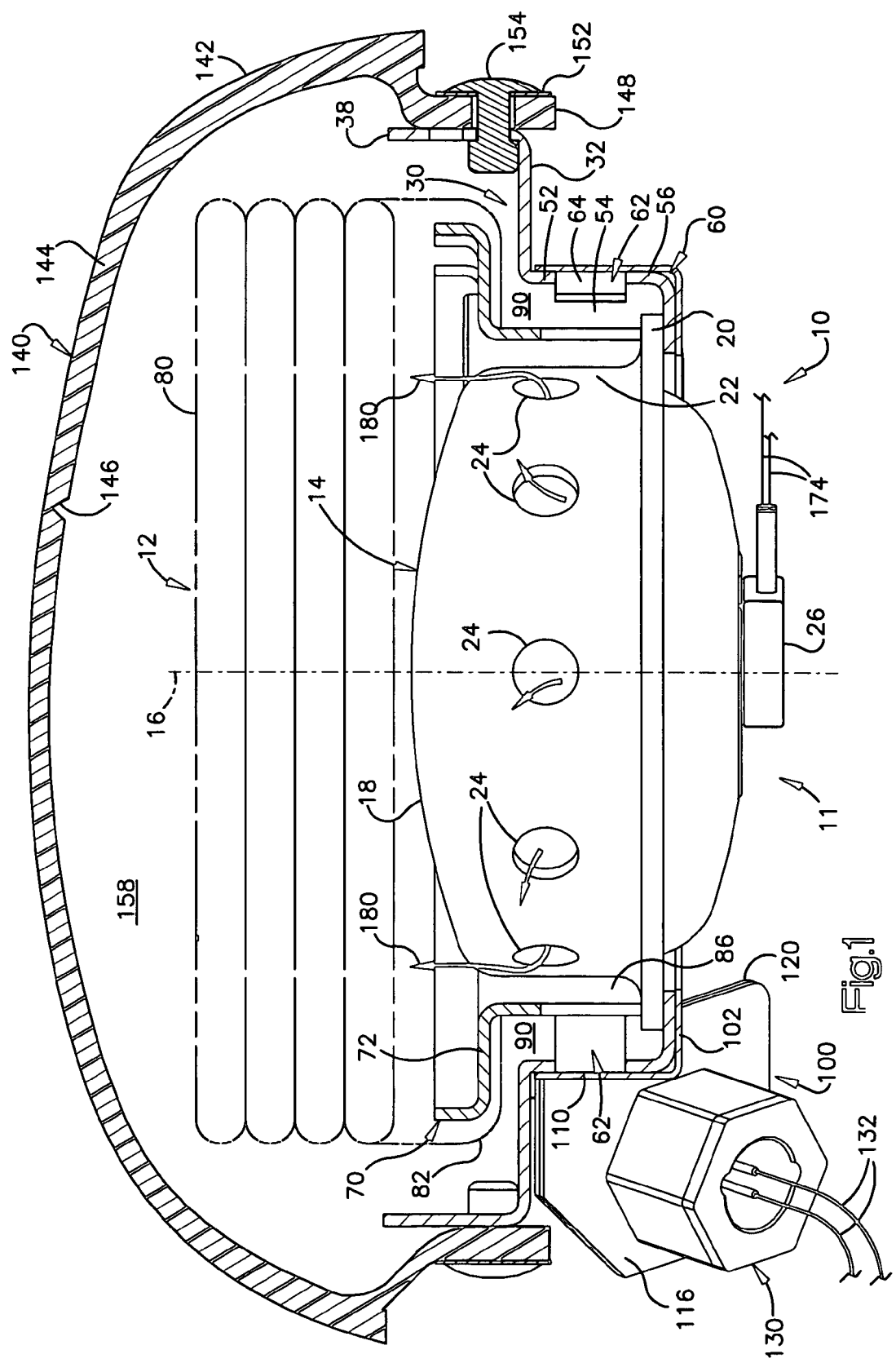
FIG. 1 is a schematic illustration, partially in section, of a vehicle occupant protection apparatus constructed in accordance with a first embodiment of the present invention, including a vent cover shown in a closed condition.
Figure 7:
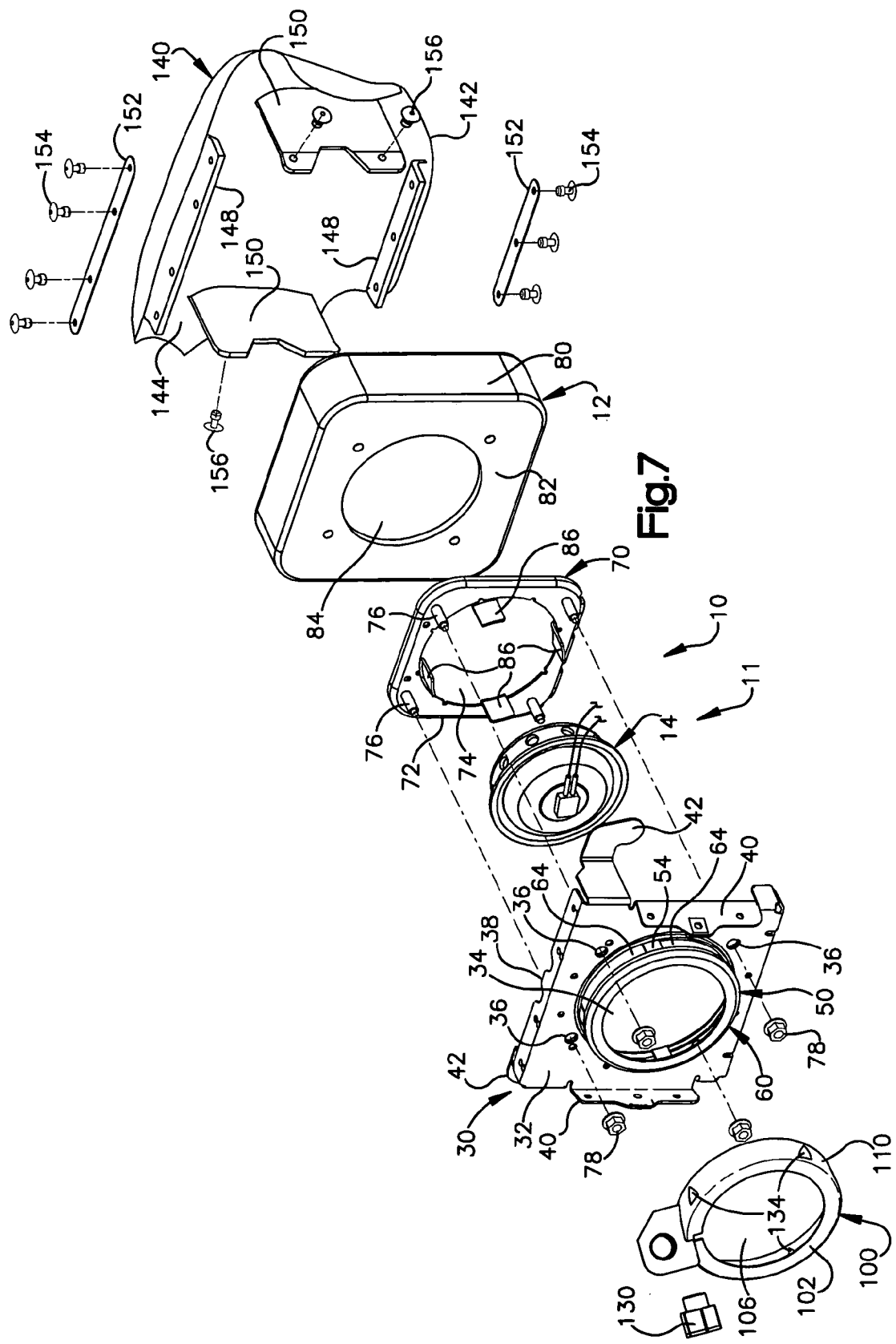
FIG. 7 is an exploded perspective view of the apparatus of FIG. 1.

The present invention relates to a vehicle occupant protection apparatus including an inflatable vehicle occupant protection device, such as an air bag. In particular, the present invention relates to an air bag module in which inflation fluid is selectively vented from the module in order to control the pressure, speed and force of deployment of the inflating air bag. As representative of the present invention, FIGS. 1–7 illustrate a vehicle occupant protection apparatus 10 constructed in accordance with the invention.

The apparatus 10 includes an air bag module 11. The module 11 includes an inflatable vehicle occupant protection device 12 of the type commonly known as an air bag. Other occupant protection devices that can be used in accordance with the invention include, for example, inflatable knee bolsters, inflatable headliners, inflatable side curtains, knee bolsters actuatable by air bags, and seat belt pretensioners.

The module 11 also includes an inflator 14. The inflator 14 comprises a source of inflation fluid for inflating the air bag 12. As known in the art, the inflator 14 may contain an ignitable gas-generating material, which, when ignited, rapidly generates a large volume of gas. The inflator 14 may alternatively contain a stored quantity of pressurized inflation fluid, or a combination of pressurized inflation fluid and ignitable material for heating the inflation fluid.

The inflator 14 illustrated in the drawings has a cylindrical configuration centered on an axis 16. The inflator 14 could have a configuration other than the cylindrical configuration illustrated in the drawings. The inflator 14 has a main body portion 18 and an annular mounting flange 20. The main body portion 18 includes an annular side wall 22 having a plurality of inflation fluid outlets 24 through which inflation fluid is directed radially outward upon actuation of the inflator 14. The inflator 14 further includes an electrical connector 26 for receiving an electric actuation signal.

The module 11 also includes a mounting member 30. The mounting member 30 is a structure that supports the other parts of the air bag module 11 on the vehicle, and that assumes the reaction forces of the inflator and the air bag when actuated. In the illustrated embodiments, the mounting member is a reaction plate.

The reaction plate 30 has a rectangular, planar central portion 32 with a circular central opening 34 for receiving the inflator 14. Four fastener openings 36 extend through the central portion 32 of the reaction plate 30, radially outward of the central opening.

The reaction plate 30 has two cover support flanges 38 that extend upward from opposite sides of the central portion 32. Two other cover support flanges 40 extend in an opposite direction, from the other two sides of the central portion 32. The reaction plate 30 also includes two module mounting flanges 42 that are secured to the vehicle in a manner not shown, and that support the reaction plate 30 on the vehicle.

The reaction plate 30 has a vent portion 50. The vent portion 50 has a cylindrical, cage-like configuration and includes a circular upper rim 52 that depends from the central portion 32 of the reaction plate 30, centered on the axis 16. The vent portion 50 also includes a plurality of tabs 54 that extend downward from the upper rim 52 and are interconnected by a lower rim 56.

The tabs 54 are spaced apart in a circular array centered on the axis 16. The tabs 54 and the rims 52 and 56 together form a perforate, annular vent wall 60 of the reaction plate 30. The vent wall 60 has a vent opening 62 that comprises a plurality of slots 64, which are the spaces between the tabs 54.

The module 11 includes a retainer 70 that is connected with the air bag 12 and that retains, or secures, the air bag in the apparatus. The retainer 70 has a ring-shaped body portion 72 extending around the main body portion 18 of the inflator 14. The body portion 72 of the retainer 70 has a circular central opening 74.

The retainer 70 includes four support posts 76, although a different number of support posts, or a different type of structure, could be provided. The support posts 76 extend into the fastener openings 36 in the central portion 32 of the reaction plate 30. Nuts 78 screwed on the support posts 76 secure the retainer 70 to the reaction plate 30.

The air bag 12 has a main body portion 80, and a mouth portion 82 with a circular inflation fluid opening 84. The mouth portion 82 of the air bag 12 is clamped between the body portion 72 of the retainer 70 and the central portion 32 of the reaction plate 30. As a result, the air bag 12 is secured to the reaction plate 30.

The retainer 70 also has four clamp legs 86 that depend from the body portion 72. The clamp legs 86 are located at the outer periphery of the central opening 74 of the retainer 70. The clamp legs 86 are in the form of rigid tabs that are spaced apart in a circular array about the axis 16.

The clamp legs 86 engage the mounting flange 20 of the inflator 14 and press it axially against the lower rim 56 of the vent portion 50 of the reaction plate 30. As a result, the mounting flange 20 of the inflator 14 is clamped between the retainer 70 and the reaction plate 30. The inflator 14 is thus secured in the module 11, with the air bag 12 and the retainer 70, on the reaction plate 30.

When the inflator 14 is secured on the reaction plate 30, the vent wall 60 of the reaction plate is located radially outward of the side wall 22 of the inflator. An annular plenum chamber 90 is defined radially outward of the inflator side wall 22 and radially inward of the reaction plate vent wall 60. The clamp legs 86 of the retainer 70 extend through the plenum chamber 90.

The module 11 includes a vent cover 100. The vent cover 100 is a structure that covers the vent opening 62 in the vent wall 60 of the reaction plate 30 when the inflator 14 is unactuated. The vent cover 100 is selectively removable from the reaction plate 30, in a manner described below, to enable venting of inflation fluid from the module 11.

The vent cover 100 of the first embodiment is formed as a split ring having a planar, ring-shaped bottom wall 102. The bottom wall 102 has an inner peripheral portion 104 that defines a circular central opening 106 in the bottom wall. The bottom wall also has an outer peripheral portion 108 (FIG. 4).

A cylindrical side wall 110 of the vent cover 100 extends upward from the outer peripheral portion 108 of the bottom wall 102. The side wall 110 has an inner diameter approximately equal to the outer diameter of the vent wall 60 of the reaction plate 30.

The side wall 110 includes portions in the form of projections 134 that project or extend radially inward from an inner surface 136 of the side wall. In the embodiment illustrated in FIGS. 3–7, the side wall 110 includes four projections 134 spaced evenly about the circumference of the side wall. The number of projections 134 and their spacing about the side wall 110 could, however, vary from that shown in FIGS. 3–7.

The projections 134 may have a variety of configurations and are produced in the side wall 110 by a known means, such as by stamping the side wall with a die. In the embodiment illustrated in FIGS. 3–7, the projections 134 have an inverted, generally badge shaped configuration with a terminal edge 138 presented toward the bottom wall 102 of the of the vent cover 100. In forming the projections 134, the side wall 110 is sheared along the terminal edge 138. The terminal edge 138 of each projection 134 is thus spaced from the inner surface 136 of the side wall 110, whereas the remainder of the projection intersects and merges with the side wall.

The side wall 110 of the vent cover 100 has first and second end portions 112 and 114. A first radially extending mounting flange 116 is disposed on the first end portion 112 of the side wall 110 and has a fastener opening 118. A second radially extending mounting flange 120 is disposed on the second end portion 114 of the side wall 110 and has a fastener opening 122. A nut 124 is welded or otherwise attached on the second radially extending mounting flange 120 at the fastener opening 122.

The first and second mounting flanges 116 and 120 extend parallel to each other and overlie each other when the vent cover 100 is in the closed condition shown in FIGS. 1–5. The fastener opening 122 in the second mounting flange 120 overlies the fastener opening 118 in the first mounting flange 116.

When the vent cover 100 is assembled with the inflator 14 and the reaction plate 30, the main body portion 18 of the inflator extends through the central opening 106 in the bottom wall 102 of the vent cover. The side wall 110 of the vent cover 100 overlies the vent wall 60 of the reaction plate 30, and covers the slots 64 of the vent opening 62 in the reaction plate.

During assembly, as the vent cover 100 is placed over the inflator 14, the portions of the projections 134 opposite the terminal ends 138 engage the inflator. As the vent cover 100 continues to move over the inflator 14, the projections 134, engaging the inflator, urge the side wall 110 in a radially outward direction away from the inflator. When the terminal ends 138 move beyond the edge of the slots 64, the projections 134 move into the slots 64 under the resilience of the material used to construct the vent cover 100. This is shown in FIG. 6A, in which a representative one of the projections 134 is shown positioned in a respective one of the slots 64.

Referring to FIG. 6A, when a projection 134 is positioned in a slot 64, the terminal end portion 138 of the projection is presented facing an edge 139 of the side wall 110 that partially defines the slot. If the vent cover 100 is urged in a direction of removal, indicated generally by the arrow in FIG. 6A, the terminal end portion 138 will engage the edge 139 of the side wall 110 and block removal of the vent cover 100 from the vent wall 60. Thus, the projections 134, once inserted into the slots 64, may be sufficient by themselves to retain the vent cover 100 on the vent wall 60.

The dimensions of the vent cover 100 may be selected so that the vent cover is secured with the vent wall 60 of the reaction plate 30 when the first and second mounting flanges 116 and 120 are brought together. An actuatable fastener 130, in the form of an explosive bolt, extends through the fastener openings 118 and 122 in the mounting flanges 116 and 120, respectively, and is screwed into the weld nut 124. The fastener 130 fastens together the first and second mounting flanges 116 and 120. As a result, the vent cover 100 is positioned adjacent or against the vent wall 60 of the reaction plate 30 and the side wall 110 may thus help block fluid flow through the slots 64 of the vent opening 62.

The dimensions of the vent cover 100 are selected so that the projections 134 are maintained positioned in the slots 64 when the first and second mounting flanges 116 and 120 are brought together and fastened with the fastener 130. This helps maintain the projections 134 positioned in their respective slots 64, which helps lock the vent cover 100 on the vent wall 60. When the projections 134 are positioned in the slots 64, the terminal end portions 138 of the projections will engage the edges of their respective slots 64 and block removal of the vent cover 100 from the vent wall 60. The side wall 110 of the vent cover 100 may thus help block fluid flow through the slots 64 of the vent opening 62.

It will be appreciated that the dimensions of the vent cover 100 may also be selected so that the side wall 110 clamps onto the vent wall when the fastener 130 fastens the first and second mounting flanges 116 and 120. In this configuration, the clamping force exerted on the vent wall 60 by the side wall 110 may supplement the connection provided by the projections 134. According to the present invention, however, the locking features provided by the projections 134 may be sufficient, alone, to provide a suitable connection between the vent cover 100 and the vent wall 60.

In the illustrated embodiments, the actuatable fastener 130 is an explosive bolt that is electrically actuatable by an electric current over lead wires 132. The actuatable fastener 130 may take different forms. The actuatable fastener 130 may alternatively be an explosive rivet, for example.

The inflator 14, the air bag 12, and the retainer 70 are, in the illustrated embodiments, enclosed in a cover 140. The cover 140 is preferably made from plastic and includes a side wall 142 and a top wall 144. The top wall 144 has a predetermined weakened portion or tear seam 146 (FIG. 1).

The cover 140 has two mounting flanges 148 that extend from the side wall 142 and two mounting flanges 150 that extend from the top wall 144. Cover retainers 152 and rivets 154 secure the mounting flanges 148 to the reaction plate flanges 38. Additional rivets 156 secure the mounting flanges 150 of the cover 140 to the reaction plate flanges 40. (The cover 140 could be mounted or attached through other means.) When the cover 140 is thus mounted on the reaction plate 30, the top wall 144 and side wall 142 of the cover, together with the reaction plate 30 and the inflator 14, define a chamber 158 (FIG. 1) in the apparatus 10. The inflation fluid outlets 24 of the inflator 14 are located in the chamber 158.

The apparatus 10 includes vehicle electric circuitry indicated schematically at 160 (FIG. 2). The vehicle electric circuitry 160 controls the operation of the inflator 14 and the actuatable fastener 130. The vehicle electric circuitry 160 includes a power source 162, which is preferably the vehicle battery and/or a capacitor, and a normally open switch 164. The switch 164 is part of a collision sensor 166, which senses a condition indicating the occurrence of a vehicle collision. The collision-indicating condition may comprise, for example, sudden vehicle deceleration caused by a collision. The vehicle electric circuitry 160 further includes a controller, or control module, 170 for controlling the operation of the vehicle electric circuitry, and a sensor assembly 172.

The sensor assembly 172 includes one or more sensors that generate one or more control signals useful in determining whether to inflate the air bag 12 with maximum speed and force when a vehicle collision is sensed. For example, the sensor assembly 172 may include an occupant position sensor that generates a control signal indicative of the position of a vehicle occupant in the interior of a vehicle. The sensor assembly 172 may also include a buckle switch for generating a control signal indicative of a buckled or unbuckled condition of a seat buckle assembly of the vehicle. The sensor assembly 172 may also include a sensor that senses the presence of a rearward-facing child seat, a weight sensor, a belt tension sensor, an occupant size sensor, a module temperature sensor, or a crash severity sensor.

If a collision-indicating condition sensed by the collision sensor 166 is above a predetermined threshold, it indicates the occurrence of a collision for which inflation of the air bag 12 is desired to help protect the occupant of the vehicle. The switch 164 in the collision sensor 166 closes and the control module 170 transmits an actuation signal to the inflator 14 over lead wires 174. When the inflator 14 is actuated, it emits a large volume of inflation fluid from the inflation fluid outlets 24, into the plenum chamber 90.

The inflation fluid flows from the plenum chamber 90, through the retainer 70, and into the mouth portion 82 of the air bag 12. The inflation fluid begins to inflate the air bag 12, which moves rapidly and forcefully outward against the top wall 144 of the cover 140. The cover 140 opens and the air bag 12 inflates into a position to help protect the vehicle occupant.

Upon such an occurrence of a condition requiring actuation of the inflator 14, the control module 170 receives the control signals from the sensor assembly 172. The control module 170 determines, on the basis of those signals, whether it is desirable to actuate the fastener 130. This determination, as well as the actuating of the fastener 130 itself, can be made prior to actuation of the inflator 14, or at the same time as actuation of the inflator, or after actuation of the inflator.

The control signals from the sensor assembly 172 may indicate a condition in which it is desirable that the air bag 12 be inflated with maximum force and speed. If the control module 170 receives signals indicating such a condition, the control module determines that the actuatable fastener 130 should remain in the unactuated condition. The fastener 130 is not energized by the control module 170, and maintains the flanges 116 and 120 of the vent cover 100 clamped against each other. The vent cover 100 remains clamped on the vent portion 50 of the reaction plate 30, covering the slots 64 of the vent opening 62. As a result, all the inflation fluid from the inflator 14 is directed from the plenum chamber 90 into the inflation fluid opening 84 of the air bag 12, as indicated by the arrows 180 (FIG. 1), and the air bag inflates with maximum speed and force.

On the other hand, one or more of the control signals from the sensor mechanism 172 may indicate a condition in which it is desirable not to inflate the air bag 12 with maximum speed and force. If the control module 100 receives a signal indicative of such a condition, the control module determines that the fastener 130 should be actuated. A control signal is transmitted from the control module 170, through the lead wires 132, to the fastener 130. The fastener 130 is electrically energized and moves from the unactuated position shown in FIG. 1 to a second, or actuated, position shown in FIG. 2.

The fastener 130, which in the illustrated embodiments is an explosive bolt, fractures. As a result, the fastener 130 no longer secures the first mounting flange 116 of the vent cover 100 to the second mounting flange 120 of the vent cover. The vent cover 100 is free to spring apart circumferentially and move away from the vent portion 60 of the reaction plate 30, under the influence of the explosive force of the bolt 130 and of gravity. This causes the projections 134 to exit their respective slots 64, which releases the vent cover to move off the vent wall 60.

The vent cover 100 moves from the installed or closed condition shown in FIG. 1 to an open condition off the vent wall 60 of the reaction plate 30, as shown in FIG. 2. The movement of the vent cover 100 enables at least some inflation fluid to be vented through the slots 64 of the vent opening 62, as indicated by the arrows 182 (FIG. 2). The vent cover 100 may come to rest on the steering wheel hub (not shown).

The inflation fluid that flows out of the chamber 90 through the vent opening 62 does not flow into the air bag 12 to inflate the air bag. In addition, some inflation fluid flows out of the air bag 12 through the vent opening 62, as indicated by the arrows 183. As a result, the amount of inflation fluid flowing into the air bag 12, or the pressure of the inflation fluid, is reduced as compared to the amount or pressure of inflation fluid flowing into the air bag when the fastener 130 remains unactuated. This change in the flow of inflation fluid can help to reduce or control the pressure, speed and force of deployment of the air bag 12.

A second embodiment of the present invention is illustrated in FIGS. 8–11. The second embodiment of the invention is similar to the first embodiment of the invention illustrated in FIGS. 1–7. Accordingly, numerals similar to those of FIGS. 1–7 will be utilized in FIGS. 8–11 to identify similar components, the suffix letter "a" being associated with the numerals of FIGS. 8–11 to avoid confusion. The second embodiment of the present invention is similar to the first embodiment (FIGS. 1–7), except that the vent cover of the second embodiment has a two-piece construction instead of a one-piece construction.

Referring to FIGS. 8–11, the vent cover 100a of the second embodiment has a two-piece construction that, when assembled, forms a split ring configuration similar to that of the first embodiment illustrated in FIGS. 1–7. The vent cover 100a is thus suitable for use with the air bag module of the first embodiment (see FIGS. 1, 2, and 7). In the two-piece construction of the second embodiment, the vent cover 100a includes a first cover piece 200 and a second cover piece 220, each of which has a generally arc-shaped or semi-circular configuration.

The first cover piece 200 has a first end portion 202 and an opposite second end portion 204. The first end portion 202 of the first cover piece 200 includes a first mounting flange 116a with a fastener opening 118a. The second cover piece 220 has a first end portion 222 and an opposite second end portion 224. The first end portion 222 of the second cover piece 220 includes a second mounting flange 120a with a fastener opening 122a. A nut 124a is welded or otherwise attached on the second radially extending mounting flange 120a at the fastener opening 122a.

The second end portion 204 of the first cover piece 200 comprises a latch member 206. As shown more clearly in FIGS. 10 and 11, the latch member 206 includes a relatively narrow strip portion 208 and a wider end portion 210. The end portion 210 has a semi-circular configuration and forms a terminal end of the first cover piece 200. The end portion 210 has an arc-shaped leading edge 212 and a pair of latching edges 214 that project inward from opposite ends of the leading edge toward the strip portion 208 and intersect with the strip portion. The second end portion 224 of the second cover piece 220 comprises a latch receiver 226. The latch receiver 226 comprises a pair of hook members 228 that have a generally U-shaped configuration and that extend from a terminal edge 230 of the second end portion 224 (see FIGS. 9–11).

Figure 10:
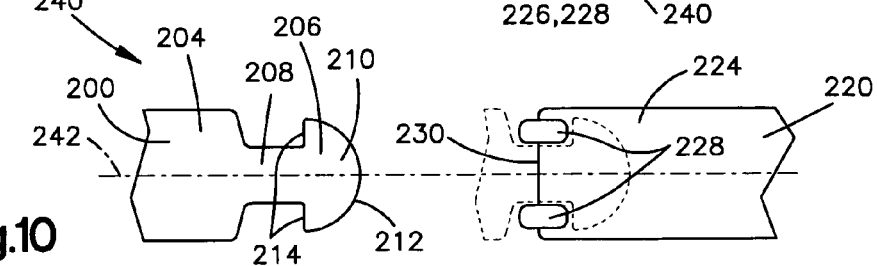
FIG. 10 is a magnified view of a portion of the vent cover of FIG. 8 illustrating the vent cover in a disassembled condition.
Figure 11:
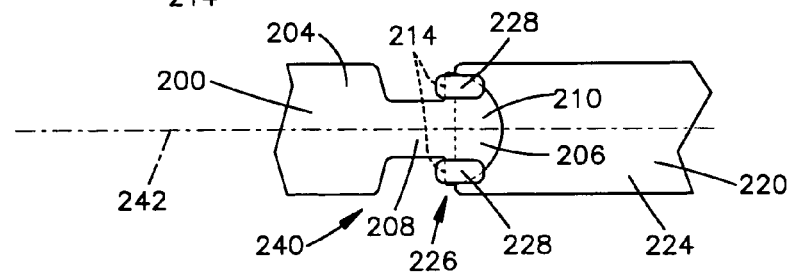
FIG. 11 is a magnified view of a portion of the vent cover of FIG. 8 illustrating the vent cover in an assembled condition.

The latch member 206 of the first cover piece 200 and the latch receiver 226 of the second cover piece 220 form a latch mechanism 240 of the vent cover 100a. The latch mechanism 240 functions to connect the second end portion 206 of the first cover piece 200 with the second end portion 226 of the second cover piece 220. As shown in FIG. 10, the first and second cover pieces 200 and 220 are aligned with each other such that the latch member 206 and latch receiver 226 are positioned along an axis 242. The first cover piece 200 is moved along the axis 242 to a position such that the latching edges 214 of the end portion 210 are positioned beyond (i.e., to the right as viewed in FIG. 10) the hook members 228 of the second cover piece 220. This is shown in dashed lines in FIG. 10. Once the end portion 210 is in this position, the latching edges 214 are guided into the U-shaped hook members 228 and the latch member 206 is received in the latch receiving member 226. This is shown in FIG. 11. The latch mechanism 240 thus interconnects the second end portion 204 with the second end portion 224 to place the first and second cover pieces 200 and 220 in the assembled condition of FIGS. 8, 9, and 11.

Figure 8:
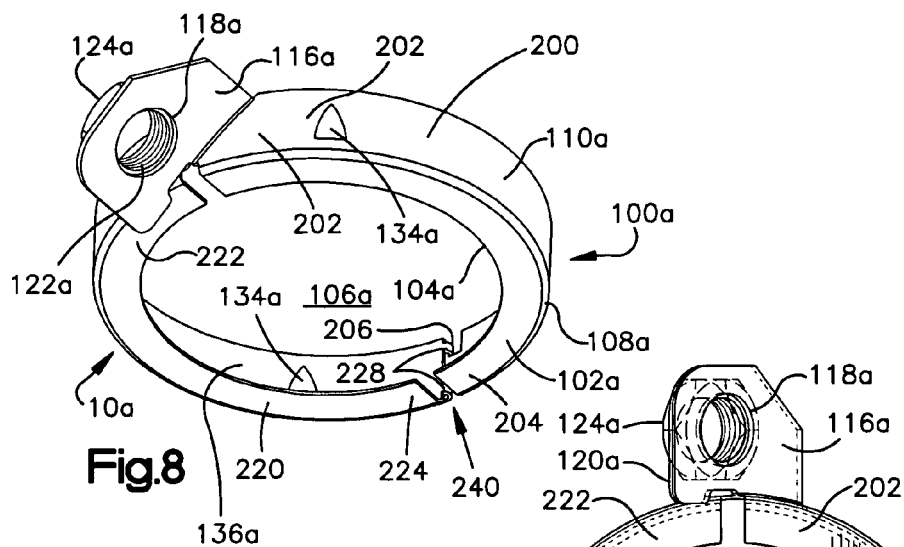
FIG. 8 is a perspective view of a vent cover in accordance with a second embodiment of the present invention.
Figure 9:
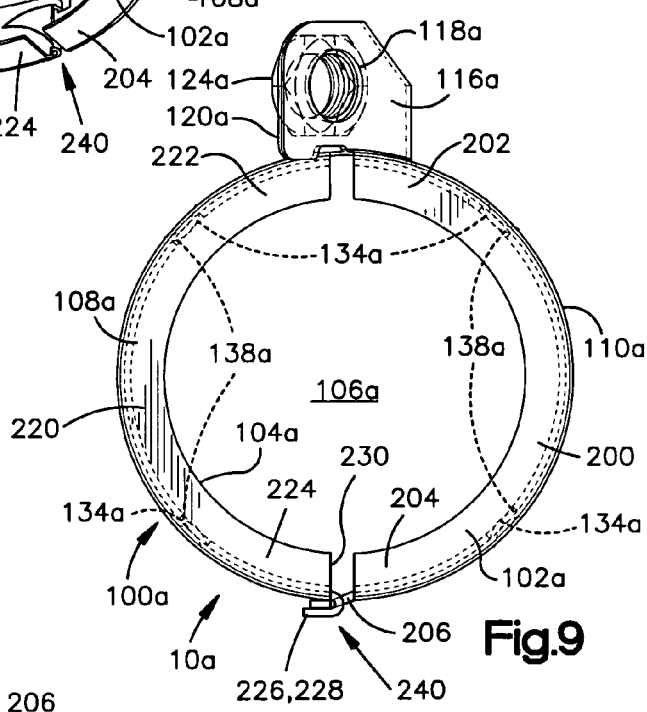
FIG. 9 is a bottom plan view of the vent cover of FIG. 8.

Referring to FIGS. 8 and 9, when the first and second pieces 200 and 220 are in the assembled condition, the vent cover 100a assumes the general configuration of the vent cover of the first embodiment (see FIGS. 1–7). The vent cover 100a thus has a planar, ring-shaped bottom wall 102a with an inner peripheral portion that defines a circular central opening 106a in the bottom wall. The bottom wall also has an outer peripheral portion 108a. A cylindrical side wall 110a of the vent cover 100a extends upward from the outer peripheral portion 108a of the bottom wall 102a. The side wall 110a includes portions in the form of projections 134a that project or extend radially inward from the inner surface 136a of the side wall. The projections 134a each include a terminal end 138a presented toward the bottom wall 102a.

The projections 134a interact with the vent wall (not shown) in a manner similar or identical to that described above in reference to the first embodiment of FIGS. 1–7. When a projection 134a is positioned in a slot (not shown), the terminal end portion 138a of the projection is presented facing an edge of the side wall 110a that partially defines the slot. If the vent cover 100a is urged in a direction of removal, the terminal end portion 138a will engage the edge of the side wall 110a and block removal of the vent cover from the vent wall. Thus, the projections 134a, once inserted into the slots, may be sufficient by themselves to retain the vent cover 100a on the vent wall.

The assembled vent cover 100a of the second embodiment is suited for connection with an air bag module in a manner similar to that described with respect to the first embodiment of FIGS. 1–7. The dimensions of the vent cover 100a may be selected so that the vent cover is secured with the vent wall of the reaction plate (not shown) when the first and second mounting flanges 116a and 120a are brought together. An actuatable fastener 130a, in the form of an explosive bolt, extends through the fastener openings 118a and 122a in the mounting flanges 116a and 120a, respectively, and is screwed into the weld nut 124a. The fastener 130a fastens together the first and second mounting flanges 116a and 120a. As a result, the vent cover 100a is positioned adjacent or against the vent wall of the reaction plate and the side wall 110a may thus help block fluid flow through the slots of the vent opening.

The dimensions of the vent cover 100a are selected so that the projections 134a are maintained positioned in the slots when the first and second mounting flanges 116a and 120a are brought together and fastened with the fastener 130a. This helps maintain the projections 134a positioned in their respective slots, which helps lock the vent cover 100a on the vent wall. When the projections 134a are positioned in the slots, the terminal end portions 138a of the projections will engage the edges of the side wall 110a that define their respective slots and block removal of the vent cover 100a from the vent wall 60. The side wall 110a of the vent cover 100a may thus help block fluid flow through the slots of the vent opening.

It will be appreciated that the dimensions of the vent cover 100a may also be selected so that the side wall 110a clamps onto the vent wall when the fastener 130a fastens the first and second mounting flanges 116a and 120a. In this configuration, the clamping force exerted on the vent wall by the side wall 110a may supplement the connection provided by the projections 134a. According to the present invention, however, the locking features provided by the projections 134a may be sufficient, alone, to provide a suitable connection between the vent cover 100a and the vent wall.

The vent cover 100a thus blocks fluid flow through vent openings (not shown in FIGS. 8–11) of the inflator. The vent cover 100a is releasable, via actuation of an actuatable fastener, to permit fluid flow through the vent openings in a manner similar to that described above with regard to the first embodiment. By "in a manner similar to", it is meant that the vent cover 100a of the second embodiment functions in a manner identical to the vent cover 100 (FIGS. 1–7) of the first embodiment, with the exception, perhaps, of small differences brought about as a result of the two-piece construction of the second embodiment as opposed to the one-piece construction of the first embodiment.

Figure 12:
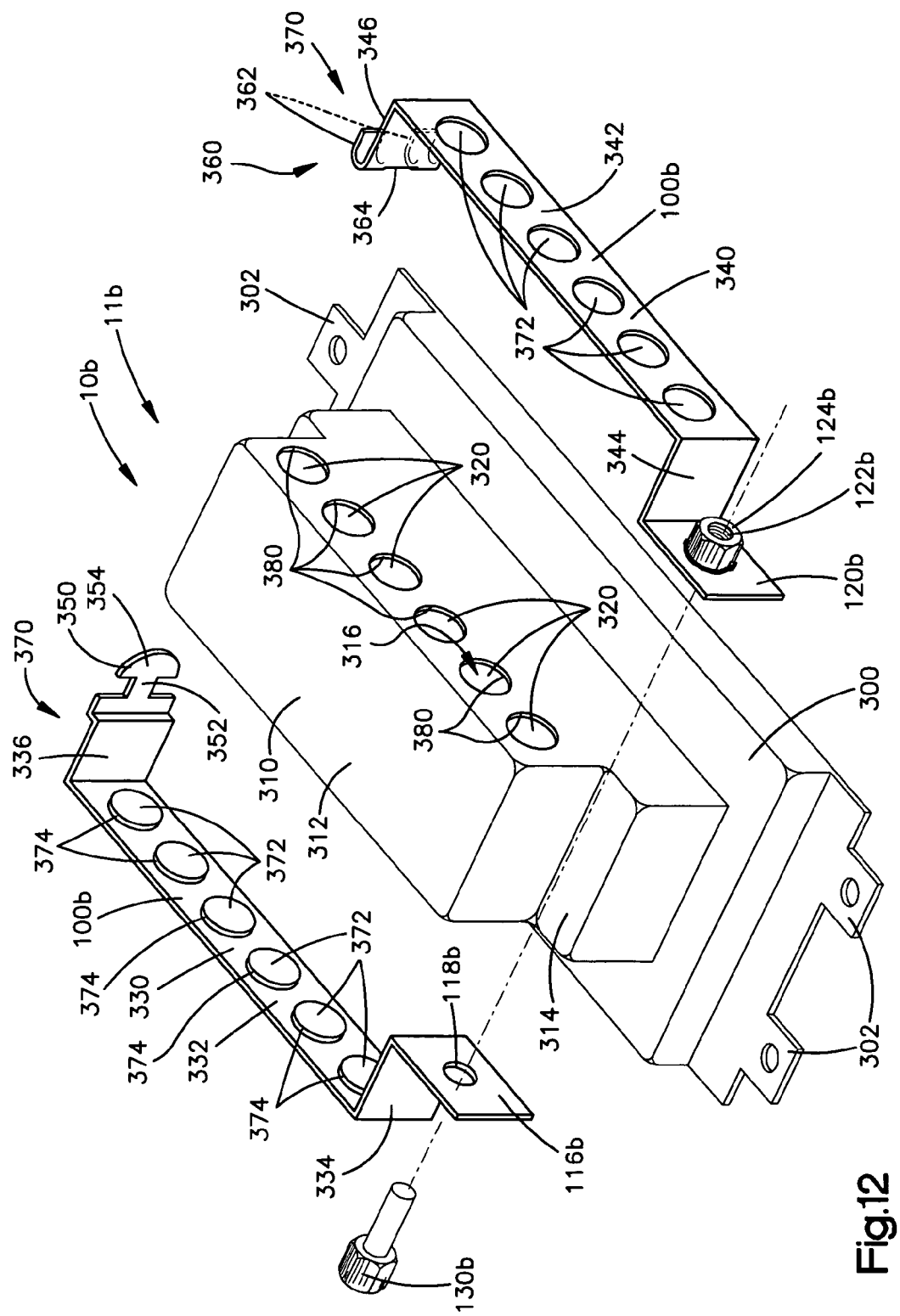
FIG. 12 is a perspective view of a vehicle occupant protection apparatus constructed in accordance with a third embodiment of the present invention, including a vent cover shown in a disassembled condition.
Figure 13:
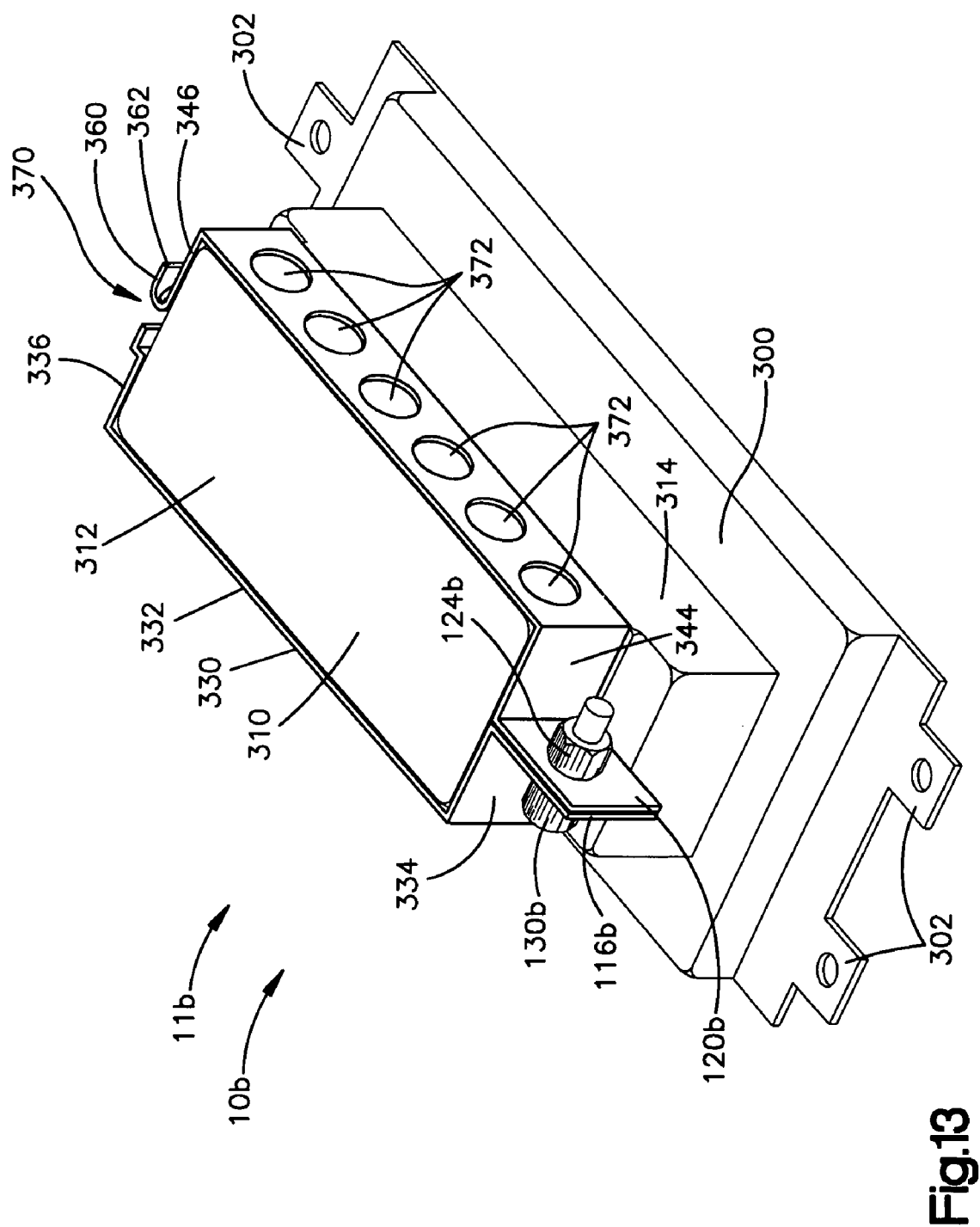
FIG. 13 is a perspective view of the vehicle occupant protection apparatus of FIG. 12 illustrating the vent cover in an assembled condition.

A third embodiment of the present invention is illustrated in FIGS. 12 and 13. The third embodiment of the invention is similar to the first and second embodiments of the invention illustrated in FIGS. 1–11. Accordingly, numerals similar to those of FIGS. 1–11 will be utilized in FIGS. 12 and 13 to identify similar components, the suffix letter "b" being associated with the numerals of FIGS. 12 and 13 to avoid confusion. The third embodiment of the present invention is similar to the first and second embodiments (FIGS. 1–11), except that the vent cover of the third embodiment has a rectangular configuration instead of a circular or ring-shaped configuration.

Referring to FIGS. 12 and 13, the apparatus 10b of the third embodiment includes an air bag module 11b having a generally rectangular configuration. The air bag module 11b is a passenger side air bag module mountable in the vehicle instrument panel or dash, whereas the module of the first and second embodiments (FIGS. 1–11) is a driver side air bag module mountable on a vehicle steering wheel. Those skilled in the art will appreciate that the air bag module 11b may also be suitable for alternative implementations, such as in an inflatable knee bolster or a side impact air bag.

The air bag module 11b includes a reaction plate 300 that supports a canister 310. In the embodiment of FIGS. 12 and 13, the reaction plate 300 and the canister 310 are formed as a single piece. The reaction plate 300 and the canister 310 could, however, have a multi-piece construction. The reaction plate 300 includes means, such as tabs 302, for securing the module 11b to the vehicle at a location such as the instrument panel (not shown). The canister 310 includes a first portion 312 and a second portion 314, each of which has a generally rectangular configuration. The first portion 312 is shorter in length and equal in width to the second portion 314. This gives the canister 310 the "stepped" appearance shown in FIGS. 12 and 13. The canister 310 of FIGS. 12 and 13 is for illustrative purposes, and it should be appreciated that the canister could have a variety of alternative configurations while maintaining its overall generally rectangular configuration.

The canister 310 forms a chamber 316 for receiving an air bag and an inflator (not shown) for inflating the air bag. The first portion 312 includes a plurality of vent holes 320 spaced along its length. The vent holes 320 are in fluid communication with the chamber 316 and vent inflation fluid from the chamber when the inflator is actuated.

The air bag module 11b of the third embodiment includes a vent cover 100b that has a rectangular configuration that mates with the outer dimensions of the first portion 312 of the canister 310 to cover the vent holes 320. As shown in FIGS. 12 and 13, the vent cover 100b has a two-piece construction similar to the second embodiment of the invention (see FIGS. 8–11). The vent cover 100b could, however, have a one piece construction similar to that of the first embodiment of the invention (see FIGS. 1–7).

The vent cover 100b includes a first cover piece 330 and a second cover piece 340. The first cover piece 330 has a longitudinally extending central portion 332 with a first end and an opposite second end. A first end portion 334 extends perpendicularly from the first end of the central portion 332. A second end portion 336 extends perpendicularly from the second end of the central portion 332. The first end portion 334 of the first cover piece 330 includes a first mounting flange 116b with a fastener opening 118b.

The second cover piece 340 has a longitudinally extending central portion 342 with a first end and an opposite second end. A first end portion 344 extends perpendicularly from the first end of the central portion 342. A second end portion 346 extends perpendicularly from the second end of the central portion 342. The first end portion 344 of the first cover piece 340 includes a second mounting flange 120b with a fastener opening 122b. A nut 124b is welded or otherwise attached on the second radially extending mounting flange 120b at the fastener opening 122b.

The second end portion 336 of the first cover piece 330 comprises a latch member 350. The latch member 350 has a configuration similar or identical to the latch member 206 of the second embodiment (see FIGS. 8–11). The latch member 350 (FIG. 12) includes a relatively narrow strip portion 352 and a wider end portion 354. The end portion 354 has a semi-circular configuration and forms a terminal end of the first cover piece 330. The end portion 354 has an arc-shaped leading edge and a pair of latching edges that project inward toward strip portion 352 and intersect with the strip portion.

The second end portion 346 of the second cover piece 340 comprises a latch receiver 360. The latch receiver 360 comprises a pair of hook members 362 having a generally U-shaped configuration that extend from a terminal edge 364 of the second end portion 346.

The latch member 350 of the first cover piece 330 and the latch receiver 360 of the second cover piece 340 form a latch mechanism 370 of the vent cover 100b. The latch mechanism 370 functions to connect the second end portion 336 of the first cover piece 330 with the second end portion 346 of the second cover piece 340. This connection is made in a manner similar to that illustrated in the second embodiment (see FIGS. 10 and 11). The latch mechanism 370 thus interconnects the second end portion 336 of the first cover piece 330 with the second end portion 346 of the second cover piece 340.

The assembled vent cover 100b of the second embodiment is thus suited for connection with the air bag module 11b in a manner similar to that described in the first and second embodiments of FIGS. 1–11. Referring to FIGS. 12 and 13, the vent cover 100b, in the assembled condition with the latch mechanism 370 interconnecting the second end portions 336 and 346, is placed around the first portion 312 of the canister 310. An actuatable fastener 130b extends through the aperture 118b in the flange 116b and through the aperture 122b in the flange 120b. The actuatable fastener 130b cooperates with the weld nut 124b to connect the flanges 116b and 120b and thus secure the vent cover 100b to the canister 310.

The vent cover 100b, when connected to the canister 310, extends around a periphery of the first portion 312. As best shown in FIG. 12, the vent cover 100b includes portions in the form of cylindrical projections 372 spaced along the central portions 332 and 342 of the first and second cover portions 330 and 340, respectively. The projections are spaced to coincide with the vent openings 320. When the vent cover 100b is connected to the canister 310, the projections 372 project or extend into the vent openings 320 in the canister 310 and thus close or block the vent openings.

The projections 372 interact with the openings 320 in the canister 310 in a manner similar to that described above in reference to the first and second embodiments. When a projection 372 is positioned in a vent opening 320, an annular side wall 374 of the projection is positioned adjacent or against an annular inner surface 380 of the canister 310 that defines the vent opening 320. If the vent cover 100a is urged in a direction of removal, the side wall 374 will engage the inner wall 380 and block removal of the vent cover from the vent wall. Thus, the projections 372, once inserted into the vent openings 320, may be sufficient by themselves to retain the vent cover 100b on the canister 310. The projections 372 and the inner surfaces 380 may even have an interference fit with each other, which may enhance the retentive forces that retain the vent cover 100b on the canister 310.

The assembled vent cover 100b of the second embodiment is suited for connection with an air bag module in a manner similar to that described with respect to the first and second embodiments. The dimensions of the vent cover 100b may be selected so that the vent cover is secured with the canister 310 when the first and second mounting flanges 116b and 120b are brought together. An actuatable fastener 130b, in the form of an explosive bolt, extends through the fastener openings 118b and 122b in the mounting flanges 116b and 120b, respectively, and is screwed into the weld nut 124b. The fastener 130b fastens together the first and second mounting flanges 116b and 120b. As a result, the vent cover 100b is positioned adjacent or against the canister 310 and the projections 372 may thus help block fluid flow through the vent openings 320.

The dimensions of the vent cover 100b are selected so that the projections 372 are maintained positioned in the vent openings 320 when the first and second mounting flanges 116b and 120b are brought together and fastened with the fastener 130b. This helps maintain the projections 372 positioned in their respective vent openings 320, which helps lock the vent cover 100b on the canister 310. When the projections 372 are positioned in the vent openings 320, the side walls 374 of the projections will engage the inner walls 380 that define their respective vent openings 320 and block removal of the vent cover 100b from the canister 310. The projections 372 of the vent cover 100b may thus help block fluid flow through the slots of the vent opening.

It will be appreciated that the dimensions of the vent cover 100b may also be selected so that the first and second cover portions 330 and 340 clamp onto the canister 310 when the fastener 130b fastens the first and second mounting flanges 116b and 120b. In this configuration, the clamping force exerted on the canister 310 by the first and second cover portions 330 and 340 may supplement the connection provided by the projections 372. According to the present invention, however, the locking features provided by the projections 372 may be sufficient, alone, to provide a suitable connection between the vent cover 100b and the canister 310.

The vent cover 100b thus blocks fluid flow through vent openings 320 in the canister. The vent cover 100b is releasable, via actuation of the actuatable fastener 130b, to release the vent cover from the canister 310 to permit fluid flow through the vent openings in a manner similar to that described above with regard to the second embodiment. By "in a manner similar to", it is meant that the vent cover 100b of the third embodiment functions in a manner identical to the vent cover 100*a* (FIGS. 8–11) of the second embodiment, with the exception, perhaps, of small differences brought about as a result of the rectangular configuration of the third embodiment as opposed to the circular or ring-shaped configuration of the second embodiment.

From the above description of the invention, those skilled in the art will perceive improvements, changes and modifications in the invention. For example, the vent wall may include openings other than the vent openings that are specially configured to receive the projections on the vent cover. These additional openings may more precisely match the size and shape of the projections and thus may provide a more secure fit between the vent wall and the vent cover. Such improvements, changes and modifications within the skill of the art are intended to be covered by the appended claims.

Having described the invention, we claim:

1. An apparatus for helping to protect an occupant of a vehicle, said apparatus comprising:
   an inflatable vehicle occupant protection device inflatable to help protect a vehicle occupant;
   an inflator for providing inflation fluid for inflating said protection device;
   a vent member including at least one vent opening for venting said inflation fluid; and
   a vent cover having a closed condition for blocking fluid flow through said at least one vent opening and an open condition for permitting fluid flow through said at least one vent opening, said vent cover including a side wall having at least one portion that projects from said side wall into said vent member to help maintain said vent cover in said closed condition, said vent cover being adapted to exert a clamping force on said vent member to help maintain said vent cover in said closed condition.

2. The apparatus recited in claim 1, wherein said at least one portion projects into said at least one vent opening, said at least one portion being engageable with a surface defining said at least one vent opening to maintain said vent cover in said closed condition.

3. The apparatus recited in claim 1, further comprising a device actuatable to place said vent cover in the open condition to enable fluid flow through said vent opening to vent inflation fluid from said apparatus.

4. The apparatus recited in claim 3, wherein said actuatable device interconnects portions of said vent cover to maintain said vent cover in said closed condition, said actuatable device being actuatable to release said portions of said vent cover to place said vent cover in said open condition.

5. The apparatus recited in claim 4, wherein said portions of said vent cover interconnected by said actuatable device comprise a first mounting flange disposed on a first end portion of said side wall and a second mounting flange disposed on a second end portion of said side wall, said actuatable device connecting said first and second mounting flanges to maintain said vent cover in the closed condition, said actuatable device being actuatable to release said first and second mounting flanges to release said vent cover for movement from the closed condition to the open condition.

6. The apparatus recited in claim 5, wherein said first and second mounting flanges extend parallel to each other and overlie each other when said vent cover is in the closed condition, said actuatable device extending through said first and second mounting flanges to interconnect said first and second mounting flanges.

7. The apparatus recited in claim 1, further including an actuatable device comprising an explosive bolt.

8. The apparatus recited in claim 1, wherein said vent member has a cylindrical configuration, said side wall of said vent cover having a cylindrical configuration that mates with said cylindrical vent member.

9. The apparatus recited in claim 8, further comprising a retainer having an annular, radially extending main body portion for clamping said protection device to said vent member, said retainer having a plurality of axially extending, circumferentially spaced clamping legs for clamping said inflator to said vent member at a location radially between inflation fluid outlets of said inflator and said vent opening;
   said circumferentially spaced clamping legs of said retainer defining between them a plurality of circumferentially spaced fluid passages that provide fluid communication between said inflation fluid outlets of said inflator and said vent opening in said vent member.

10. The apparatus recited in claim 9, wherein said vent member comprises a reaction member for supporting said apparatus on the vehicle.

11. The apparatus recited in claim 1, wherein said vent member has a rectangular configuration, said side wall of said vent cover having a rectangular configuration that mates with said rectangular vent member.

12. The apparatus recited in claim 1, wherein said vent member comprises a reaction member for supporting said apparatus on the vehicle.

13. The apparatus recited in claim 1, wherein said vent cover is formed as a split ring having a generally cylindrical configuration.

14. The apparatus recited in claim 1, wherein said vent cover is formed as a split ring having a generally rectangular configuration.

15. An apparatus for helping to protect an occupant of a vehicle, said apparatus comprising:
   an inflatable vehicle occupant protection device inflatable to help protect a vehicle occupant;
   an inflator for providing inflation fluid for inflating said protection device;
   a vent member including at least one vent opening for venting said inflation fluid; and
   a vent cover having a closed condition for blocking fluid flow through said at least one vent opening and an open condition for permitting fluid flow through said at least one vent opening, said vent cover including a side wall having at least one portion that projects from said side wall into said vent member to help maintain said vent cover in said closed condition,
   said vent cover including a first cover portion and a second cover portion, said first cover portion having a first end and an opposite second end, said second cover portion having a first end and an opposite second end,
   said second ends of said first and second cover portions being engageable with each other to interconnect said second ends of said first and second cover portions;
   said first ends of said first and second cover portions being connectable to each other via an actuatable device.

16. The apparatus recited in claim 15, wherein one of said second ends comprises a latch member and the other of said second ends comprises at least one hook member, said latch member being engageable with said at least one hook member to connect said second ends of said first and second cover portions.

17. The apparatus recited in claim 15, wherein said vent member has a cylindrical configuration, said first and second cover portions each having a semi-cylindrical configuration.

18. The apparatus recited in claim 15, wherein said vent member has a rectangular configuration, said first and second cover portions each having a semi-rectangular configuration.

19. An apparatus for helping to protect an occupant of a vehicle, said apparatus comprising:
   an inflatable vehicle occupant protection device inflatable to help protect a vehicle occupant;
   an inflator for providing inflation fluid for inflating said protection device, said inflator having a plurality of inflation fluid outlets;
   a vent member connected with said inflator, said vent member having a vent wall including at least one vent opening;
   a vent cover including a side wall having at least one portion that projects from said side wall, said vent cover having a closed condition in which said at least one portion projects into said at least one vent opening to help connect said vent cover to said vent member, said vent cover having an open condition in which said at least one portion is retracted from said at least one vent opening to enable fluid flow through said at least one vent opening to vent inflation fluid from said apparatus; and
   an actuatable device having an unactuated condition maintaining said vent cover in the closed condition, said actuatable device having an actuated condition that places said vent cover in the open condition to enable fluid flow through said vent opening to vent inflation fluid from said apparatus.

* * * * *